July 29, 1924.
C. E. HAYWOOD
SPRAYING MACHINE
Filed July 30, 1923    2 Sheets-Sheet 1
1,503,159
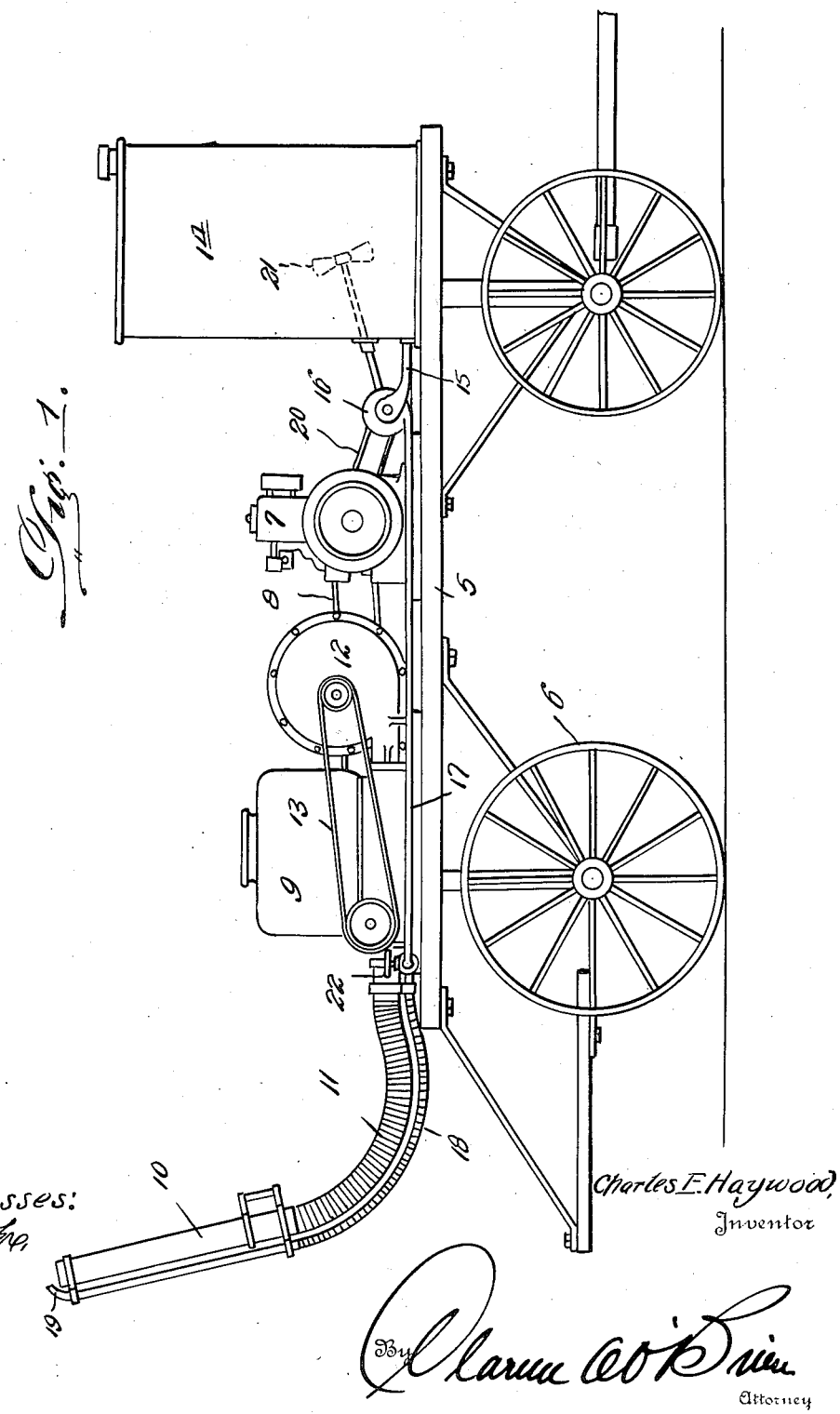

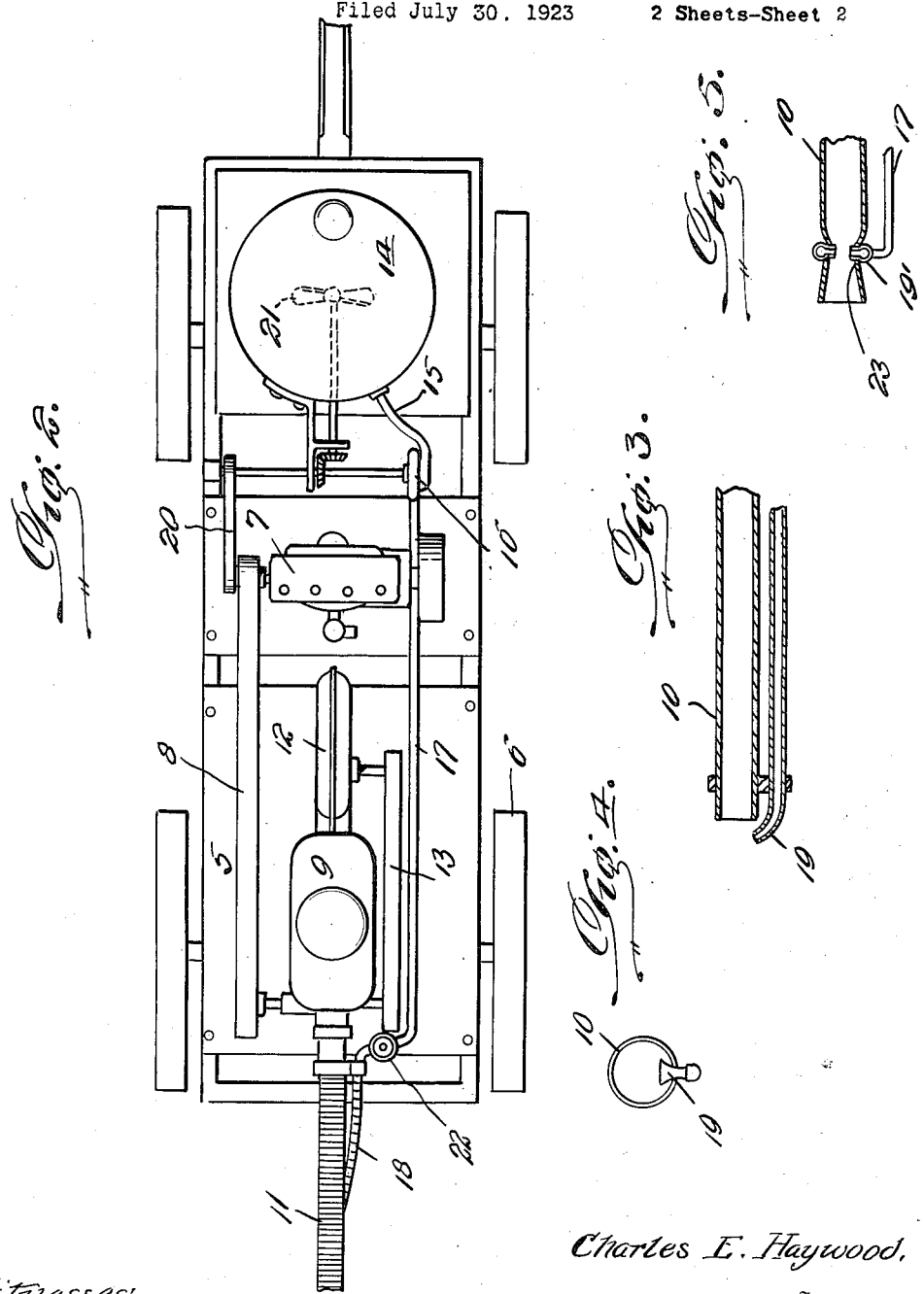

Patented July 29, 1924.  1,503,159

UNITED STATES PATENT OFFICE.

CHARLES E. HAYWOOD, OF LARKINS, FLORIDA.

SPRAYING MACHINE.

Application filed July 30, 1923. Serial No. 654,542.

*To all whom it may concern:*

Be it known that I, CHARLES E. HAYWOOD, a citizen of the United States, residing at Larkins, in the county of Dade and State of Florida, have invented certain new and useful Improvements in Spraying Machines, of which the following is a specification.

This invention relates to the treatment of trees, plants and flowers, and has particular reference to an improved spraying machine.

The primary object of the invention is to provide a spraying machine by means of which the work may be accomplished with facility and ease at a distance from the trees or the like, or without requiring moving of the spray nozzle over the surface of the foliage.

Briefly described, the invention operates on the principle of an atomizer and is preferably formed by adding a nozzle, for discharge of the liquid spraying materials, to the orifice of the discharge pipe of a machine commonly known as a power grove duster, but may embody an air blower constructed on a principle similar to the grove duster, the liquid discharge nozzle being connected, by means of a flexible hose or pipe, to a tank or other suitable source of supply for the liquid spraying material. The device is preferably portable with the tank and other parts mounted upon a suitable truck, and includes means for supplying a fast moving large volume of air under low pressure as a carrying vehicle for the liquid spraying material.

The objects, operation and advantages of the invention will become apparent from the following description of the invention, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view showing the present invention embodied in a power grove duster.

Figure 2 is a top plan view, partly broken away, of the device shown in Figure 1.

Figure 3 is a fragmentary, longitudinal, sectional view of the discharge nozzles.

Figure 4 is an end elevational view of the device shown in Figure 3.

Figure 5 is a view similar to Figure 3 of a modified form of nozzle construction.

Referring more in detail to the drawings, the invention is shown embodied in an ordinary power grove duster which includes a truck having a platform 5 mounted upon suitable supporting wheels 6 and having a suitable motor 7 fixed thereon, the motor 7 being utilized through the usual gearing 8 to control the feeding of the dust from the receptacle 9 to the spray nozzle 10 which is flexibly connected as at 11 with a blower 12. The blower 12 is adapted to supply a large volume of air under low pressure and at a high velocity to the nozzle 10 and is driven by the motor 7 by the belt drives 8 and 13.

Details of this conventional structure are not shown as they, in themselves, are well known in the art and form no part of the present invention.

In accordance with the present invention a tank 14 is suitably mounted upon the platform 5 and is adapted to receive the desired liquid spraying material, this tank being provided with an outlet 15 communicating with a pump 16 whose outlet connects with a discharge line 17 that is flexibly connected as at 18 to a discharge nozzle 19 terminating in the path of the air passing through the nozzle 10. The pump 16 simply carries the liquid to the nozzle 19 when the latter is elevated above the level of the liquid in the supply tank 14 and is not used to create any appreciable pressure, one of the features of the invention being to eliminate high pressure in devices of the present kind.

The pump is driven through a suitable gearing generally denoted by the numeral 20 from the motor 7 and the tank 14 preferably includes a stirrer 21 also driven from the motor 7 for agitating the contents of receptacle 14 so as to insure a thorough mixture of the ingredients of the liquid, and to prevent undue settling thereof.

The discharge line 17 is provided with a shut off valve 22 so that the liquid spray may be controlled or cut off and it is apparent that the supply of dust may also be discontinued when it is desired to only spray the trees or the like with liquid.

From the foregoing description, it will be seen that the invention embodies means to supply a large volume of air at practically no pressure but great velocity and means to convey or deposit the spraying liquid in the path of this air as distinguished from supplying the same to the air under pressure so that the air will act as a carrying vehicle for the spraying liquid, whereby the spray will be delivered over a great area and to an appreciable distance.

The nozzle 19 may be extended beyond the end of the nozzle 10, as shown in Figures 1, 3 and 4, and may be of fan shape, as shown in Figure 4, with a long restricted outlet, but a nozzle or nozzles with a round outlet port may also be used.

As shown in Figure 5, the nozzle 10 may be constructed with a restricted portion as at 23 similar to a Venturi tube, and a plurality of nozzles 19' may extend from the discharge line 17 and enter this restricted portion 23. Such a construction will operate similar to the Venturi tube and serve to atomize the liquid in an effective manner.

The advantages to be gained from a device constructed in accordance with the present invention are readily apparent in that the application of the spraying materials is made from a moderate distance and in such manner as to cover a large area, thereby rendering it unnecessary to move a small nozzle over nearly the entire surface of the tree or the like to be sprayed. Also, the invention contemplates a practical arrangement whereby either liquid or dust may be sprayed onto the trees, or both.

I am aware that machines have been constructed which employ the principle of atomization in spraying but they embody two lines of hose, one of which conveys air under pressure, and the other of which conveys the liquid under pressure to a nozzle, this nozzle being carried by a long rod by means of which it is moved over the surface of the foliage to be sprayed.

However, the above known construction differs from the present invention in that the latter employs a large volume of air at practically no pressure and traveling at great velocity which is employed as a carrying vehicle for the liquid, which liquid is applied, deposited or the like, to the air as distinguished from being supplied with the air under pressure.

From the foregoing description it is believed that the construction and operation of the invention will be readily understood, and it is noted that minor changes may be made without departing from the spirit and scope of the invention as claimed.

What I claim as new is:

In a spraying machine, a relatively large air discharge nozzle, means for supplying a large volume of air under low pressure and high velocity through said nozzle, a relatively small liquid discharge nozzle associated with the outlet end of said air nozzle and opening in the path of the air, means for supplying spraying liquid through the second-mentioned nozzle under low pressure, manually controlled means for supplying dust to the air before the latter passes to said nozzle, and manually operable means to render the liquid supplying means operative or inoperative.

In testimony whereof I affix my signature.

CHARLES E. HAYWOOD.